H. SMITH.
Square and Saw.
No. 20,313.
Patented May 18, 1858.
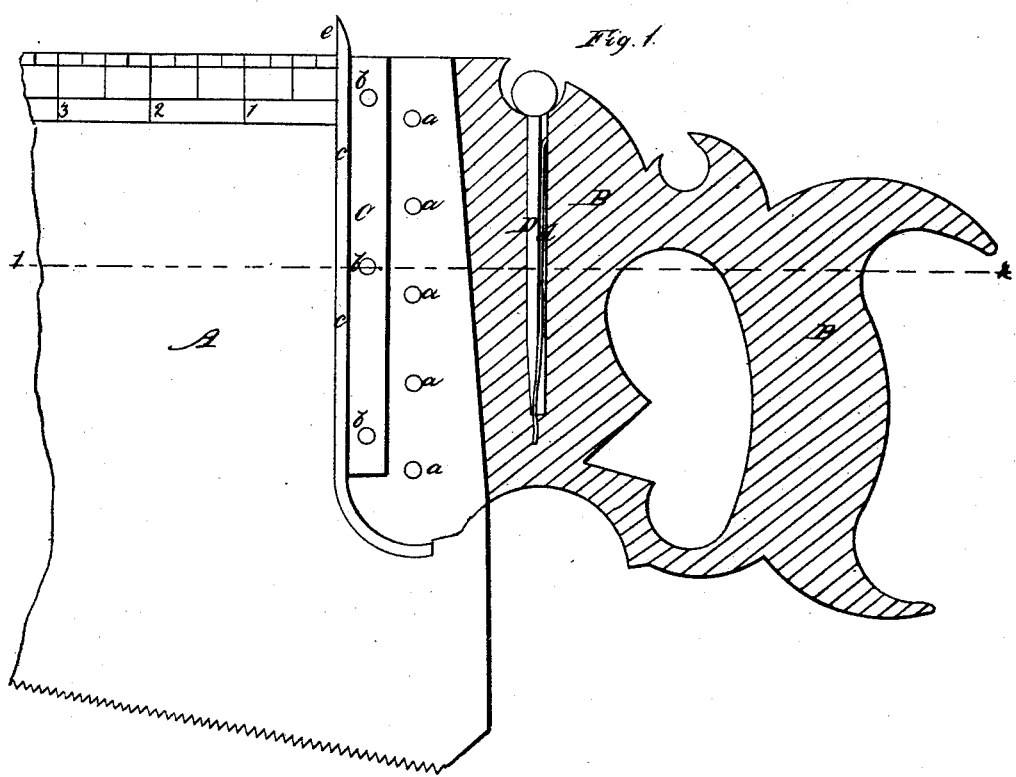
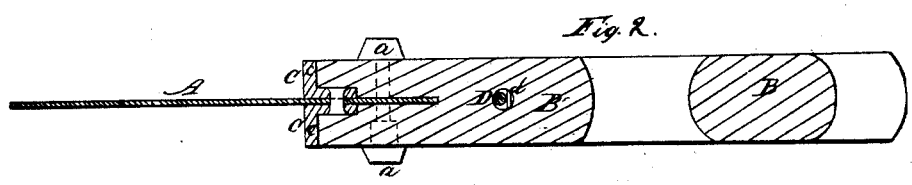

UNITED STATES PATENT OFFICE.

H. SMITH, OF CAMDEN, NEW JERSEY, ASSIGNOR TO H. DISSTON, OF PHILADELPHIA, PENNSYLVANIA.

DEVICE ATTACHED TO HANDSAWS FOR SQUARING AND MARKING.

Specification of Letters Patent No. 20,313, dated May 18, 1858.

*To all whom it may concern:*

Be it known that I, HIRAM SMITH, of the city of Camden and State of New Jersey, have invented certain Improvements in Handsaws; and I do hereby declare the following to be a full, clear, and exact description of the same, reference being had to the accompanying drawing and to the letters of reference marked thereon.

My invention relates to improvements in the combined handsaw and square, for which Letters Patent were granted to Jackson Gorham, on the 12th day of May, 1856; and my improvements consist in securing direct to the saw blade, and adjacent to, but independent of, the handle, certain metal strips, which form the butt or stock of the square, so that the said strips may always remain at right angles to the upper edge of the saw blade, and may not be disturbed by any loosening of the handle, which is secured to the blade by separate attachments. Above the upper edge, and at or near the point where it meets the strips, is a sharp projection, from which to the end of the blade, the latter is graduated into feet and inches and into suitable fractions of an inch, the sharp projection, in conjunction with the graduated scale, serving to measure and mark off the measurement of lumber and other objects.

In order to enable others skilled in the art to make and use my invention, I will now proceed to describe its construction.

On reference to the accompanying drawing, which forms a part of this specification, Figure 1 is a side view of sufficient of a hand saw to show my improvements. Fig. 2 a section on the line 1, 2, (Fig. 1).

A is a portion of the blade of the saw, secured to the handle by the ordinary screws *a*. To each side of the blade, I rivet a metal strip C, the handle fitting against the inside of the projecting flanges *c* of the strips, on each side. The outside of the projecting flanges are situated at right angles to the upper edge of the saw blade, which thus forms the blade of the square, of which the strips C are the butts. A continuation of the flanges C, projects above the upper edge of the saw blade, and is reduced to a sharp edge, so as to form a marker. From this sharp edged projection, the upper edge of blade is graduated into feet, inches and fractions of an inch. In the handle B is an orifice for the reception of the marker D, a spring *d*, secured to the bottom of the orifice, serving the purpose of retaining the marker in its position within the handle, when not required for use.

In Gorham's patent, above alluded to, the handle of a saw is so constructed, as to form of itself the butt of the square; and as it is apt, through constant strains and hard usage, to become loose, it is evident that when this occurs, the instrument will cease to be of any utility as a square. By securing metal to metal, however, as above described, there is no danger of the strips C moving from their original position, which cannot be changed by any loosening of the handle, inasmuch as the latter is secured to the blade by independent attachments.

As the upper edge of the saw blade is graduated into definite lengths, from the extreme end of the blade to the sharpened projection *e*, the latter must serve the very useful purpose of marking off the distance determined by the blade in measuring long pieces of lumber and other objects, and the saw, thus arranged, will obviate the necessity of a carpenter carrying the ordinary detached rule and pencil or other marker.

I do not desire to claim the graduating of a saw blade, so that it may serve the purpose of a rule; neither do I claim broadly, so constructing a saw, as to answer the purposes of both a handsaw and square in one and the same instrument; but I claim and desire to secure by Letters Patent, as an improvement on the combined hand saw and square, for which a patent was granted to Jackson Gorham on the 12th day of May, 1856.

1. Riveting the shoulder strips C, C, directly to the blade and independent of the handle for the purpose specified.

2. The combination of the sharpened projection *e* with the graduated saw blade, as, and for the purpose herein set forth.

In testimony whereof I have signed my name to this specification before two subscribing witnesses.

HIRAM SMITH.

Witnesses:
HENRY HOWSON,
HENRY ODIORNE.